United States Patent
Obara

(10) Patent No.: US 6,639,336 B2
(45) Date of Patent: Oct. 28, 2003

(54) SPINDLE MOTOR AND MANUFACTURING METHOD THEREOF

(75) Inventor: Rikuro Obara, Miyota-machi (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/991,716

(22) Filed: Nov. 26, 2001

(65) Prior Publication Data

US 2002/0063483 A1 May 30, 2002

(30) Foreign Application Priority Data

Nov. 28, 2000 (JP) .................................. 2000-361198

(51) Int. Cl.[7] .............................. H02K 7/08; H02K 5/16
(52) U.S. Cl. ...................... 310/90; 384/67 R; 384/245
(58) Field of Search .............................. 310/90, 67 R; 384/610, 245, 243, 244

(56) References Cited

U.S. PATENT DOCUMENTS

| 5,610,462 | A | * | 3/1997 | Takahashi | 310/90 |
| 5,677,585 | A | * | 10/1997 | Ida et al. | 310/91 |
| 5,715,116 | A |   | 2/1998 | Moritan et al. | |
| 5,822,846 | A |   | 10/1998 | Moritan et al. | |
| 5,834,870 | A | * | 11/1998 | Tokushima et al. | 310/90 |
| 5,982,064 | A | * | 11/1999 | Umeda et al. | 310/90 |
| 5,998,898 | A | * | 12/1999 | Fukutani et al. | 310/90 |
| 6,265,797 | B1 | * | 7/2001 | Horng | 310/90 |
| 6,271,612 | B1 | * | 8/2001 | Tanaka et al. | 310/90 |
| 6,316,856 | B1 | * | 11/2001 | Kusaki et al. | 310/90 |
| 6,318,976 | B1 | * | 11/2001 | Hsieh | 417/423.12 |
| 6,339,273 | B1 | * | 1/2002 | Higuchi | 310/91 |
| 6,340,854 | B1 | * | 1/2002 | Jeong | 310/90 |
| 2001/0045786 | A1 | * | 11/2001 | Sekine | 310/156.38 |

* cited by examiner

Primary Examiner—Nestor Ramirez
Assistant Examiner—Heba Yousri M. Elkassabgi
(74) Attorney, Agent, or Firm—Oliff & Berridge, PLC

(57) ABSTRACT

A spindle motor having a pivot which tip portion can easily be formed by a spherical surface having high precision, high hardness, the diameter of which can be determined as desired, the tip portion 6a of the pivot 6 is formed by cutting a steel ball used in a bearing or the like having any diameter. The pivot 6 having a spherical surface 6a is formed by fixing the pivot tip portion 6a to one side surface 6c of a substantially cylindrical shaft portion 6b. As a result, the spherical surface having a high precision, high hardness which diameter can be determined as desired can easily be formed at the tip portion 6a of the pivot 6.

3 Claims, 5 Drawing Sheets

SPINDLE MOTOR AND MANUFACTURING METHOD THEREOF

BACKGROUND OF THE INVENTION

1. Field of the Invention

The present invention relates to a spindle motor for a hard disk drive device or the like provided with a fluid bearing and a method for manufacturing the same.

2. Description of the Related Art

In a spindle motor for driving a hard disk drive device (hereinafter referred to as HDD), there is a demand for rotation at high speed in accordance with a recent requirement of large capacity and high speed properties in a hard disk. A spindle motor in which a pivot of a rotor is supported by a fluid bearing having low sliding resistance and a high rotation precision is well known. FIG. 4 shows an example of a spindle motor provided with a fluid bearing 4 in which a substantially cylindrical stationary shaft 5 is positioned uprightly and coaxially with a pivot 61 of a rotor 3 in a stator 2, and also, a sleeve 7 into which the pivot 61 is to be inserted with a minute gap is fitted in a sleeve-fitting hole 5a formed in an inner circumferential surface of the stationary shaft 5. An opening on one side of the sleeve-fitting hole 5a is closed by a thrust plate 8 and a minute gap between the pivot 61 and the sleeve 7 and a space on the upper surface of the thrust plate 8 in communication with the minute gap are filled with a predetermined amount of fluid, and thus, the spindle motor, in which the pivot 61 is supported by the fluid bearing 4, is formed. As shown in FIG. 4, a hub 9 is fitted around the pivot 61 to form a rotor 3, and a plurality of hard disks 10 are mounted around an outer circumferential surface 9a of the hub 9, and magnets 11 are arranged at an equal spacing in an annular shape on an inner circumferential surface 9b of the hub 9. Also, an armature 12 including a stator stack 12a and a coil 12b is arranged to face the magnets 11 on the outer circumferential surface of the stationary shaft 5.

As shown in FIG. 4, in the spindle motor using such a fluid bearing, the thrust load from the rotor 3 is received by the stator 2 in a structure that the spherical pivot tip portion 61a is supported by the thrust plate 8, and an ideal rotation of the rotor 3 is created by a structure that the spherical portion of the pivot tip portion 61a contacts the thrust plate 8 at one point on the rotary shaft of the pivot 61. However, if the precision of the spherical surface of the pivot tip portion 61a is inferior, particularly in high speed rotation of the rotor 3, the contact point between the pivot tip portion 61a and the thrust plate 8 moves along the spherical surface of the pivot tip portion 61a causing vibration of the pivot 61, and thus causes the reading surface of the hard disk 10 to vibrate vertically.

However, forming a spherical surface at one end of a shaft involves a very difficult machining. The machining to form the tip portion 61a of the pivot 61 into a spherical surface with high precision has been an inefficient work demanding a lot of skill and time. Moreover, since the tip portion 61a of the pivot 61 rotates in contact with the thrust plate 8, it is preferable to perform a heat treat such as quenching; however, this was not possible due to a deformation on the high precision machined spherical surface caused by the heat treatment. Although it is possible to obtain the precision of the spherical surface by grinding the spherical surface after performing the heat treatment to the pivot tip portion 61a, it is very difficult and impractical to obtain high precision through grinding as it is well known. Lightweight and a remarkable cooling effect are expected by using a ceramic material for the thrust plate 8. In this case, however, it is not possible to subject the pivot tip portion 61a to a heat treatment, and thus the wearing resistance of the spherical face is insufficient. Therefore, usage of ceramic material on the thrust plate 8 had to be avoided. Also, it was a desire to facilitate the assembly and control of parts by integrating the pivot 61 with the hub 9. However, this could not be realized, since machining a spherical surface with high precision at one end of the shaft formed integrally with the hub 9 is extremely difficult.

Therefore, as shown in FIG. 5, conventionally used is a pivot 62 in which an internal conical portion 13 coaxial with the pivot 62 is formed in one side surface 62a of a shaft portion 62b of the pivot 62, and a steel ball 14 used in a bearing or the like that is superior in sphericity (coaxiality) and hardness is fixed or press-fitted in the internal conical portion 13. However, in a pivot formed like pivot 62, a diameter of the usable steel ball 14 is limited to a small level and it is impossible to form a large spherical surface having such a diameter that a higher rotational precision can be ensured. Since the pivot 62 still requires machining in the inner conical portion 13 with high precision on one side surface of the shaft, it is difficult to form the hub 9 and the pivot 62 integrally.

SUMMARY OF THE INVENTION

It is therefore an object of the present invention to provide a spindle motor and a manufacturing method therefor in which the spindle motor having a pivot which tip portion can easily be formed by a spherical surface having high precision, high hardness, which diameter can be determined as desired is manufactured.

In order to achieve the above object, according to a first aspect of the present invention, in a spindle motor comprising a rotor in which a pivot having a spherical surface at a tip portion rotates in unity with a hub, a stator having a substantially cylindrical stationary shaft uprightly and coaxially with the pivot, the stator having a sleeve abutting to the inner surface of the shaft, the pivot inserted into the sleeve within a minute gap, a thrust plate for closing an opening on one side of the stationary shaft and for supporting a spherical surface formed at the tip portion of the pivot, a fluid which is filled in the minute gap formed between the pivot and the sleeve and in a space above an upper face of the thrust plate which space communicating to the minute space between the pivot and the sleeve, the spindle motor is characterized in that the pivot has a tip portion formed by cross sectionally cutting a steel ball and fixing one end of the pivot to one side surface of the shaft.

With such a structure, it is possible to readily obtain the spherical tip portion of the pivot which diameter can be determined as desired having high precision and high hardness.

In the spindle motor according to a second aspect of the present invention, the thrust plate is formed of a ceramic material.

With such a structure, it is possible to reduce weight of the spindle motor and to enhance a cooling efficiency of the motor.

In the spindle motor according to a third aspect of the present invention, the pivot is formed integrally with the hub.

With such a structure, it is possible to reduce the parts and to facilitate the assembly and control of the parts.

According to a fourth aspect of the present invention, in a method for manufacturing a spindle motor comprising: a rotor in which a pivot having a spherical surface at a tip portion rotates in unity with a hub, a stator having a substantially cylindrical stationary shaft uprightly and coaxially with the pivot, the stator having a sleeve abutting to the inner surface of the shaft, the pivot inserted into the sleeve within a minute gap, a thrust plate for closing an opening on one side of the stationary shaft and for supporting a spherical surface formed at the tip portion of the pivot, a fluid which is filled in the minute gap formed between the pivot and the sleeve and in a space above an upper face of the thrust plate which space communicating to the minute space between the pivot and the sleeve, the method comprising a process for cross sectionally cutting a steel ball which forms a tip portion on the pivot, and a process of fixing one end of the pivot to one side surface of the shaft.

With such a structure the steel ball is cut in the steel ball cutting process, thereby it is possible to obtain the pivot tip portion formed by a spherical surface the diameter of which can be determined as desired having high precision and high hardness. Also, in the pivot tip portion bonding process, the pivot tip portion obtained by the steel ball cutting process is fixed to one side surface of the shaft, thereby it is possible to form the pivot with high rotation precision.

DESCRIPTION OF THE PREFERRED EMBODIMENTS

Figure 1:
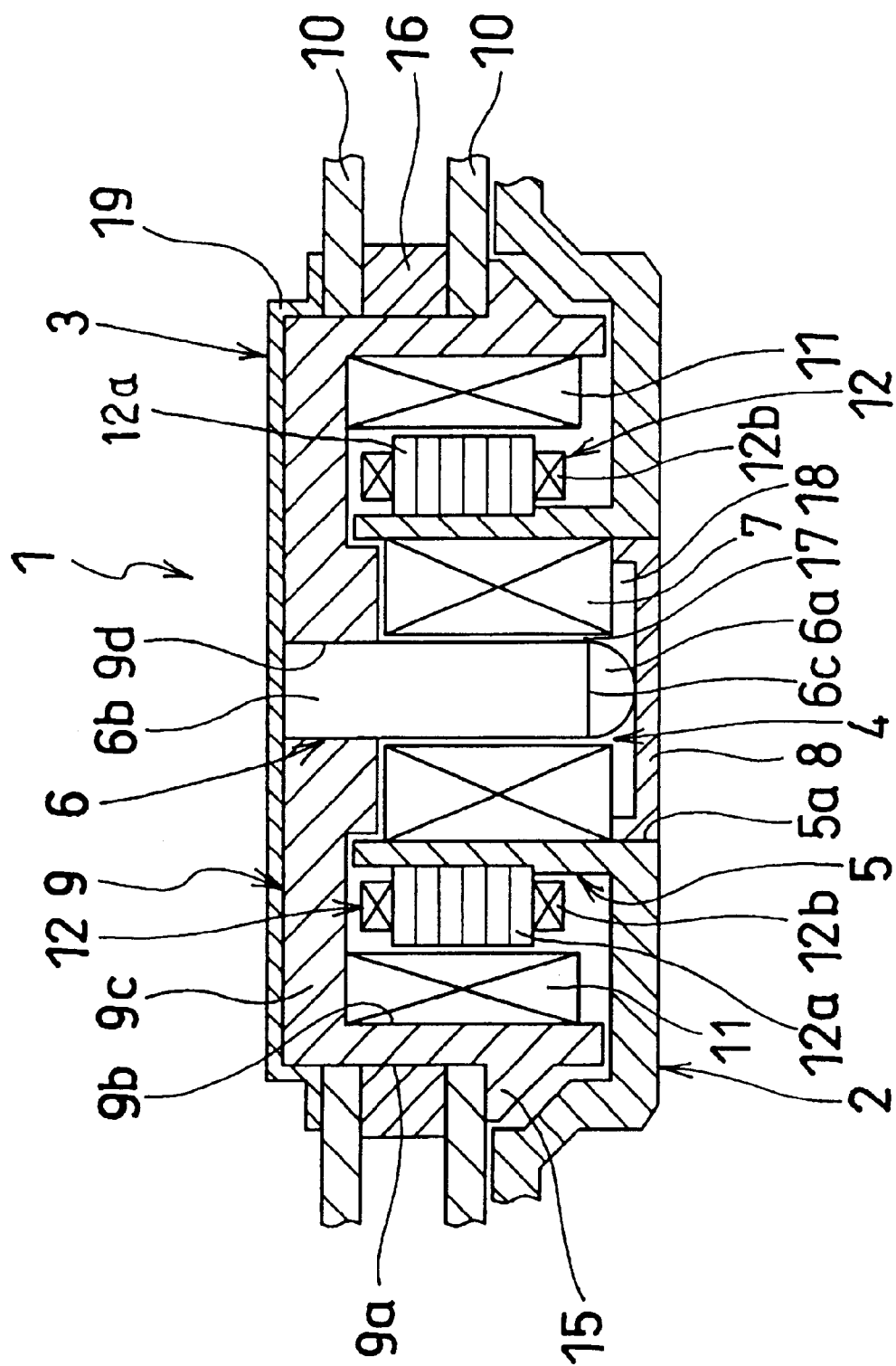
FIG. 1 is a view showing a spindle motor in accordance with one embodiment of the present invention.
Figure 2:
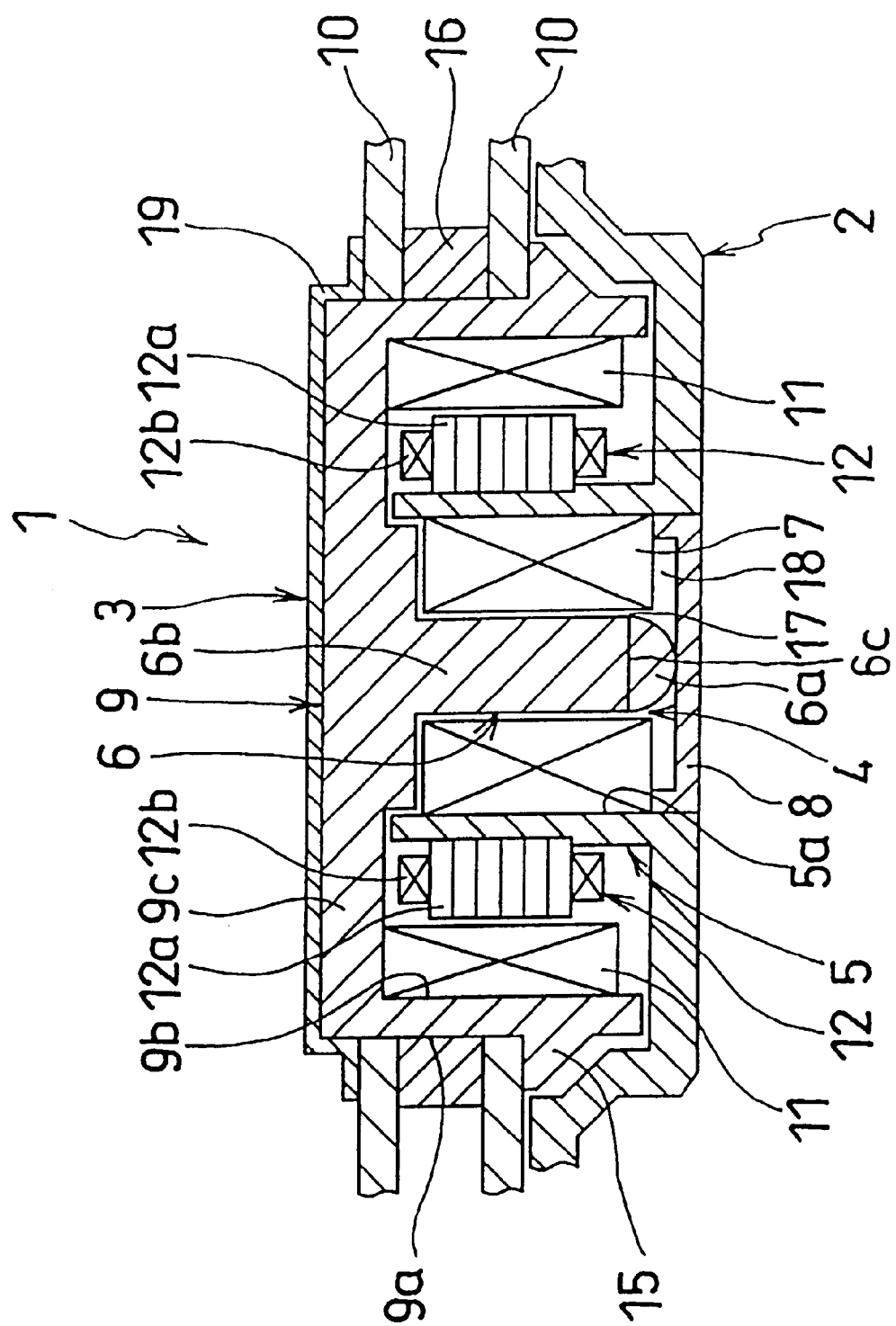
FIG. 2 is a view showing a spindle motor in accordance with another embodiment of the present invention, in particular, a spindle motor having a rotor in which a shaft portion of a pivot and a hub are formed integrally.

A spindle motor and a method for producing the same in accordance with an embodiment of the present invention will now be described with reference to FIGS. 1 to 3. The same reference numerals will be used to indicate the same parts in structure as those of the above-described conventional spindle motor. First of all, the spindle motor according to an embodiment of the present invention will be described. As shown in FIG. 1, the spindle motor 1 according to the embodiment of the present invention is provided with a fluid bearing 4 in which a pivot 6 of a rotor 3 is pivoted by a sleeve 7 through a fluid. A pivot tip portion 6a formed by a spherical surface is supported by a thrust plate 8 provided to a stationary shaft 5 of a stator 2. The spindle motor 1 in accordance with this embodiment has a structure in which the pivot tip portion 6a is formed by cutting a steel ball having a predetermined diameter cross sectional, and fixing its cut surface to one side surface 6c of a substantially cylindrical shaft portion 6b, thereby the pivot 6 provided with the spherical surface the diameter of which can be determined as desired and having high precision and high hardness at the tip portion 6a can readily be formed.

A structure of the spindle motor 1 in accordance with the embodiment will now be described in detail. The spindle motor 1 mainly includes a stator 2 and the rotor 3. In the stator 2, as shown in FIG. 1, a substantially cylindrical stationary shaft 5 is provided uprightly and coaxially with a rotation shaft (pivot 6) of the rotor 3, a sleeve-fitting hole 5a is formed at an inner circumferential surface of the stationary shaft 5, and a plurality of armatures 12 formed by winding coils 12b around stator stacks 12a are arranged in an annular shape and at an equal spacing on an outer circumferential surface of the stationary shaft 5. Also, as shown in FIG. 1, the rotor 3 has a substantially cylindrical hub 9 having a bottom surface 9c on one side, and the shaft portion 6b of the pivot 6 is fitted on a bottom surface 9c of the hub 9. The external diameter (d in FIGS. 3A to 3C) of the shaft portion 6b of the pivot 6 is set so that the shaft portion 6b can be inserted with a minute gap into the sleeve 7 fitted around a sleeve fitting hole 5a of the stationary shaft 5. The hub 9 is provided with an annular flange portion 15 on its outer circumferential surface, and has a structure in which a hard disk 10 mounted by means of the flange portion 15 is retained.

Reference numeral 9a is an outer circumferential surface of the hub 9 and reference numeral 9b is an inner circumferential surface of the hub 9.

In FIG. 1, reference numeral 16 is a spacer to be interposed between a plurality of hard disks 10, and reference numeral 19 is a cover to be mounted on the rotor 3. A plurality of magnets 11 arranged to face the armatures 12 disposed on the outer circumferential surface of the stationary shaft 5 of the stator 2 are provided on the inner circumferential surface of the hub 9. Also, the thrust plate 8 is provided so as to close the opening of the sleeve-fitting hole 5a of the stationary shaft 5 in the stator 2 and to support the pivot tip portion 6a of the rotor 3. Fluid is filled in a minute gap 17 between the pivot 6 and the sleeve 7 and a space 18 above an upper surface of the thrust plate 8 in communication with the minute gap 17; thus the fluid bearing 4 is formed inside the stationary shaft 5 of the stator 2. Furthermore, as shown in FIG. 1, a labyrinth seal structure including narrow and complicated passages is formed between the minute gap 17 between the pivot 6 and the sleeve 7 and the outer portion of the spindle motor 1 in the spindle motor 1 according to this embodiment.

The process of manufacturing the pivot 6 of the rotor 3 in the thus constructed spindle motor 1 will now be described.

(1) Steel Ball Cutting Process

Figure 3A:
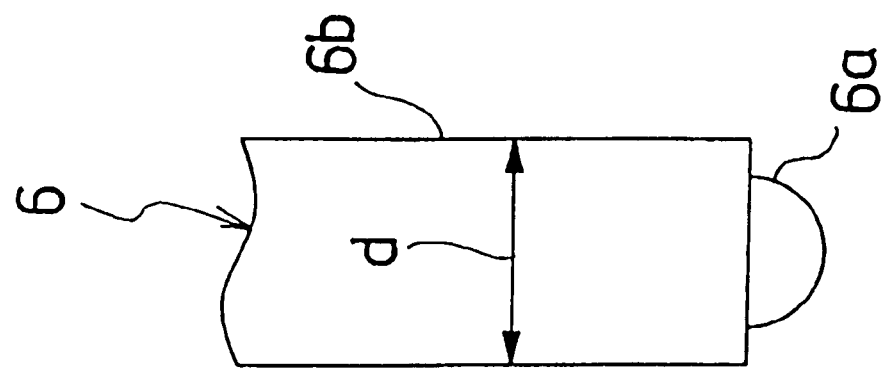
FIGS. 3A, 3B and 3C are views showing pivots to be used in the spindle motor in accordance with the embodiments, FIG. 3A showing that a diameter of a spherical surface is smaller than an external diameter of a shaft portion, FIG. 3B showing that the diameter of the spherical surface is equal to the external diameter of the shaft portion, and FIG. 3C showing that the diameter of the spherical surface is larger than the outer diameter of the shaft portion
Figure 3B:
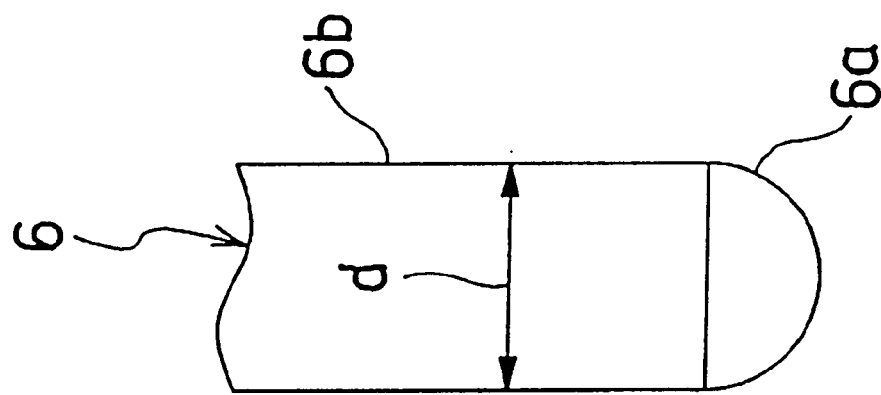
Figure 3C:
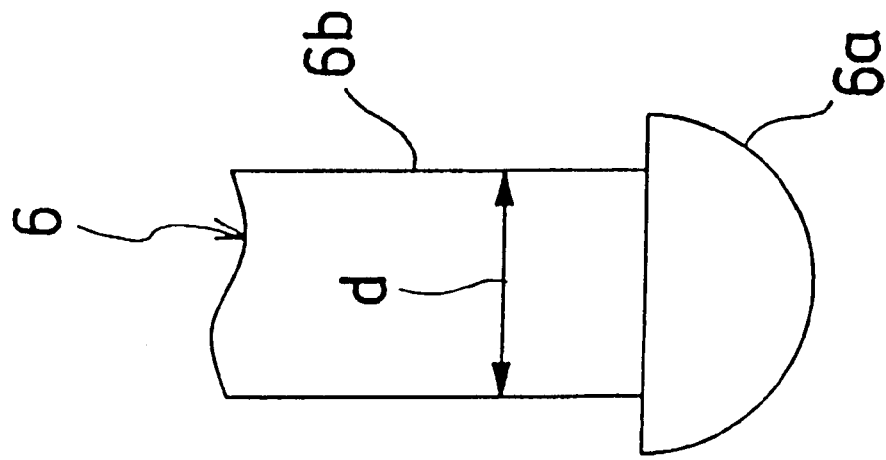

First, a steel ball having a spherical diameter that is equal to an outer diameter (d in FIGS. 3A to 3C) of the shaft portion 6b of the pivot 6 is cut by a cutting means such as a wire cut to thereby form divided spherical parts as the pivot tip portion 6a having a cut surface of a circle of the diameter d. It is not always necessary to make the spherical diameter of the steel ball equal to the outer diameter of the shaft portion 6b as shown in FIG. 3B, but it is possible to determine a spherical diameter for the steel ball in accordance with the specification of the spindle motor 1 as shown in FIGS. 3A and 3C.

(2) Pivot Tip Portion Fixing Process

Next, the cut surface of the divided spherical part as the pivot tip portion 6a obtained in the steel ball-cutting process and one side surface 6c of the shaft portion 6b of the pivot 6 are brought into abutment with each other and fixed to a positioning jig (not shown). Then, the interface between the pivot tip portion 6a and the shaft portion 6b is bonded by bonding means such as electronic beam welding to form the pivot 6 having a spherical face with high precision and high hardness on the tip portion 6a. Since energy is gathered at a high density in a narrow range of the joint portion in the electron beam welding, it is an effective joining method for avoiding the influence of the heat distortion. Moreover, it is possible to fix the pivot tip portion 6a to one side surface 6c of the shaft portion 6b by using an adhesive.

Thus formed pivot 6 is fitted in the pivot fitting hole 9d formed in the hub 9 to form the rotor 3. As shown in FIG. 2, it is possible that the hub 9 and the shaft portion 6b of the pivot 6 are formed integrally, and the pivot tip portion 6a formed in the process of cutting the steel ball is fixed to one side surface 6c of the shaft portion 6b to form the pivot 6 having a spherical surface. The pivot tip portion 6a is formed of the steel ball with high hardness; consequently the wearing resistance of the spherical surface is considerably enhanced, and thus a lightweight ceramic material with a high cooling effect can be used for the thrust plate 8 for supporting the pivot tip portion 6a.

Figure 4:
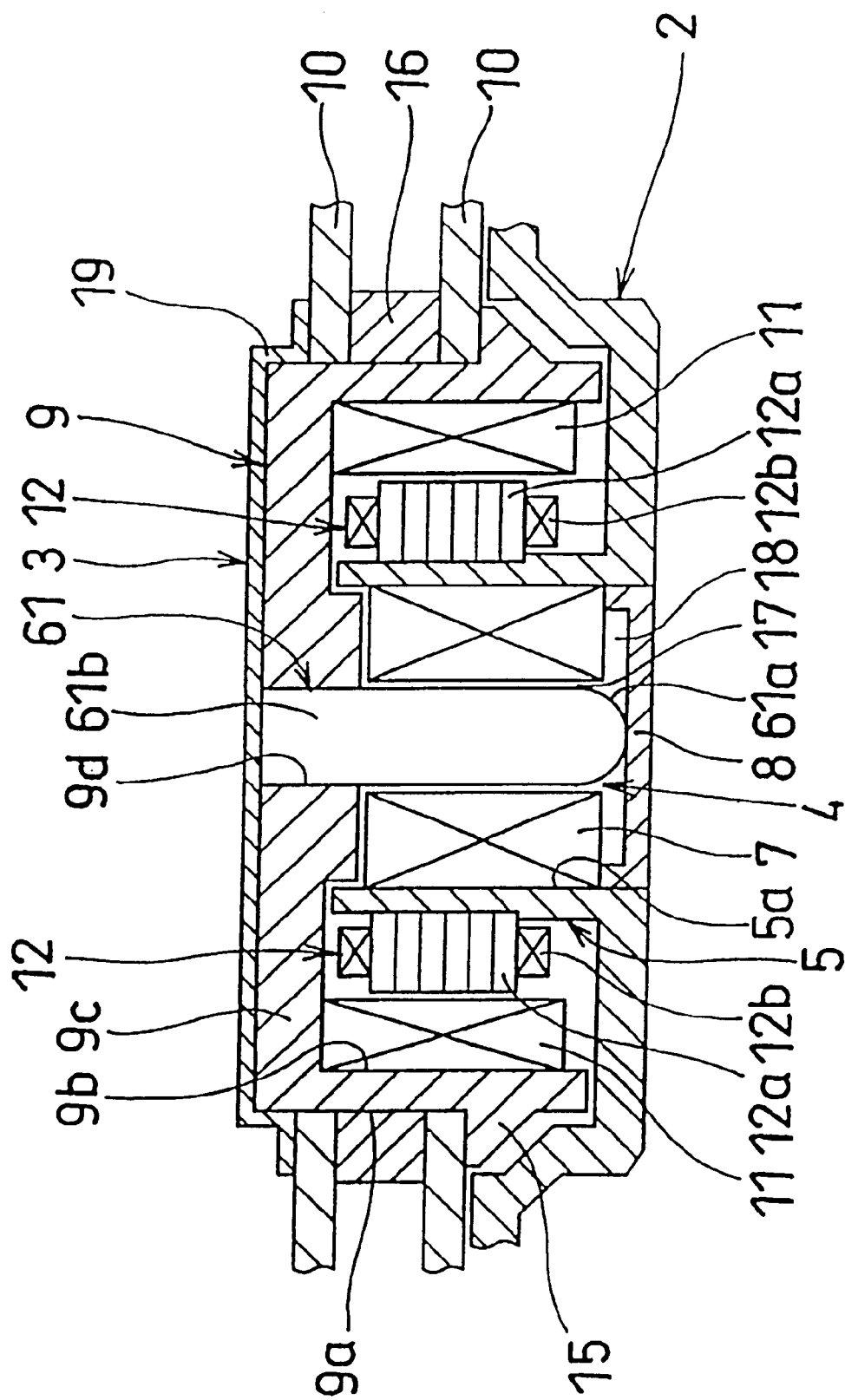
FIG. 4 is a view showing a conventional spindle motor.
Figure 5:
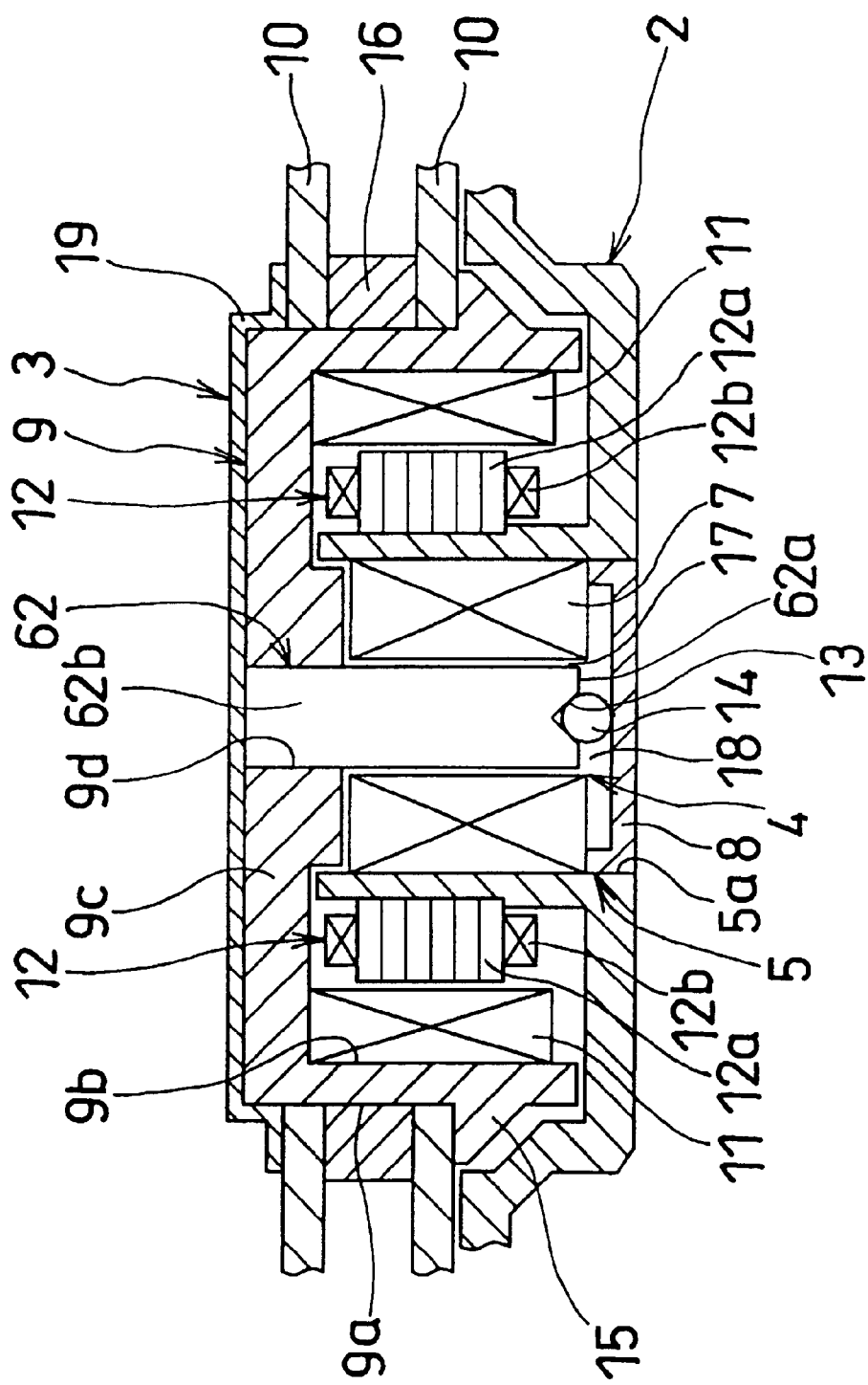
FIG. 5 is a view showing a conventional spindle motor showing, in particular, a spindle motor provided with a pivot in which a steel ball is fitted in an internal conical portion formed in a pivot tip portion.

In the above-mentioned construction, the effect of the spindle motor and the manufacturing method therefor in accordance with this embodiment will now be described. In the spindle motor 1 in accordance with this embodiment, the pivot tip portion 6a formed by cutting the steel ball in a semispherical body is fixed to one side surface 6c of the shaft portion 6b to form the pivot 6; therefore it is possible to form the tip portion 6a of the pivot 6 as a spherical surface the diameter of which can be determined as desired, having high precision and high hardness. In the spindle motor 1 provided with the thus formed pivot 6, it is possible to rotate the rotor 3 at a high speed under the high rotation precision. In addition, the spherical surface of the pivot tip portion 6b can be obtained by the process of cutting the steel ball and the process of the pivot tip portion. Since a difficult and troublesome machining work such as forming a spherical surface with high precision at an end of the shaft portion 61b as in the pivot 61 of the conventional spindle motor (see FIG. 4) is not necessary, the process of manufacturing the pivot 6 is considerably rationalized, thus reducing the manufacturing cost. Also, using the steel ball with high hardness for the pivot tip portion 6a makes it possible to use the lightweight ceramic material with a high cooling effect for the thrust plate 8. Furthermore, since it is not necessary to conduct the troublesome machining work to the shaft portion 6b of the pivot 6, it is possible to form the rotor 3 in which the shaft portion 6b and the hub 9 are integrally formed and thus, to reduce the parts to simplify the assembly and control of the parts.

According to the first aspect of the invention, since the pivot tip portion formed by cutting the steel ball is fixed to one side surface of the shaft portion to form the pivot, it is possible to form the tip portion of the pivot having the spherical surface the diameter of which can be determined as desired, having high precision and high hardness, and thus to rotate the spindle motor at a high speed with high rotation precision. Moreover, since the difficult and troublesome machining work such as forming a spherical surface with high precision at one end of the shaft portion as in the conventional pivot is not necessary, the process of manufacturing the pivot is considerably rationalized, thus reducing the manufacturing cost.

According to a second aspect of the invention, since the ceramic material is used for the thrust plate, it is possible to reduce the weight of the spindle motor and to enhance the cooling effect of the motor.

According to a third aspect of the invention, since the shaft portion and the hub are formed integrally, it is possible to reduce the number of parts and to simplify the assembly and control of the parts.

According to the fourth aspect of the invention, since the pivot tip portion is formed by cutting the steel ball in accordance with the process of cutting the steel ball and thus formed pivot tip portion is fixed to one side surface of the shaft portion in accordance with the process of fixing the tip portion, it is possible to form the tip portion of the pivot having the spherical surface the diameter of which can be determined as desired, having high precision and high hardness without the troublesome and difficult machining work such as forming the spherical surface with high precision at one end of the shaft portion as in the conventional pivot, so that the process of manufacturing the pivot is considerably rationalized, thus reducing the manufacturing cost.

What is claimed is:

1. A spindle motor comprising a rotor in which a pivot having a spherical surface at a tip portion rotates in unity with a hub, a stator having a substantially cylindrical stationary shaft upright and coaxial with said pivot, said stator having a sleeve abutting to the inner surface of said shaft and said pivot inserted into said sleeve within a minute gap, a thrust plate for closing an opening on one side of said stationary shaft for supporting a spherical surface formed at the tip portion of said pivot, a fluid which is filled in said minute gap formed between said pivot and said sleeve and in a space above an upper face of said thrust plate which space communicates with said minute gap formed between said pivot and said sleeve, the spindle motor characterized in that said pivot half spherical steel ball having a tip portion fixed to one end of said pivot to one side surface of said shaft, wherein a hardness of the tip portion is harder than a hardness of the shaft.

2. The spindle motor according to claim 1, wherein said thrust plate is formed of ceramic material and a hardness of said thrust plate is harder than a hardness of the tip portion.

3. A method for manufacturing a spindle motor comprising;

a rotor in which a pivot having a spherical surface at a tip portion rotates in unity with a hub, a stator having a substantially cylindrical stationary shaft upright and coaxial with said pivot, said stator having a sleeve abutting to the inner surface of said shaft, said pivot inserted into said sleeve within a minute gap, a thrust plate for closing an opening on one side of said stationary shaft and for supporting a spherical surface formed at the tip portion of said pivot, a fluid which is filled in said minute gap formed between said pivot and said sleeve and in a space above an upper face of said thrust plate which space communicates with said minute gap formed between said pivot and said sleeve, the method comprising:

a process for cross sectionally cutting a steel ball into said half sperical which forms a tip portion on said pivot, and a process of fixing one end of said pivot to one side surface of said shaft.

* * * * *